June 11, 1957 L. C. McNUTT 2,795,689
AUTOMATIC PIPE WELDING APPARATUS
Filed Feb. 24, 1954 5 Sheets-Sheet 1

Inventor
Louis C. McNutt
By A. D. T. Libby
Attorney

June 11, 1957 L. C. McNUTT 2,795,689
AUTOMATIC PIPE WELDING APPARATUS
Filed Feb. 24, 1954 5 Sheets-Sheet 2

Inventor:
Louis C. McNutt
By A. D. T. Libby
Attorney.

June 11, 1957 — L. C. McNUTT — 2,795,689
AUTOMATIC PIPE WELDING APPARATUS
Filed Feb. 24, 1954 — 5 Sheets-Sheet 3
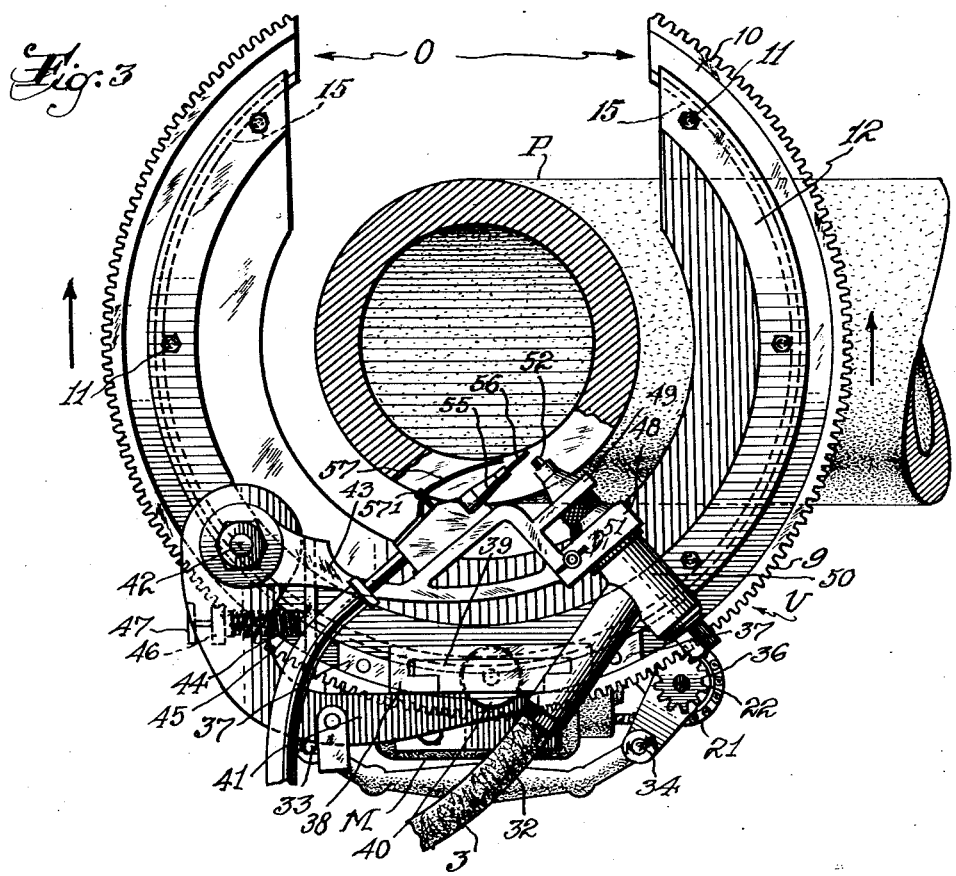
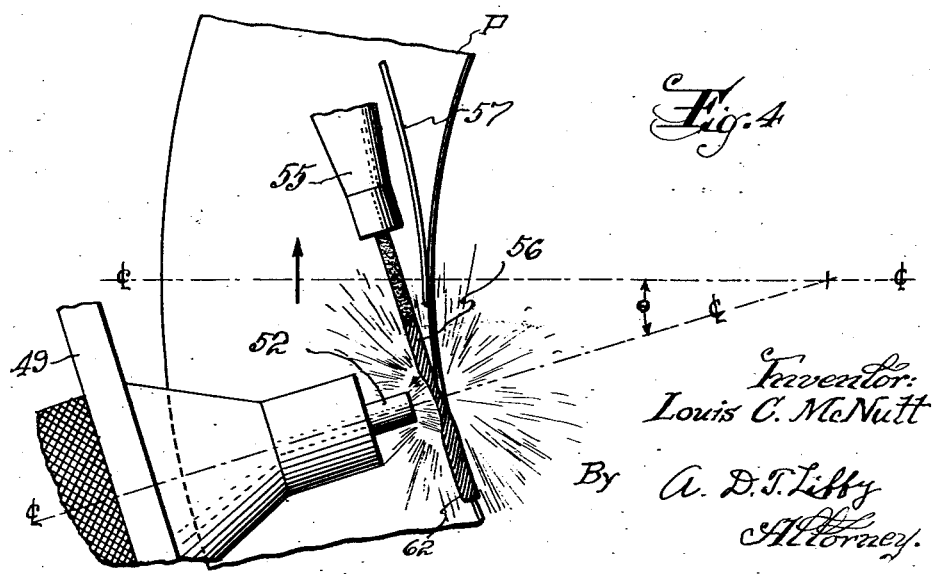
Inventor:
Louis C. McNutt
By A. D. T. Libby
Attorney June 11, 1957  L. C. McNUTT  2,795,689
AUTOMATIC PIPE WELDING APPARATUS
Filed Feb. 24, 1954  5 Sheets-Sheet 4
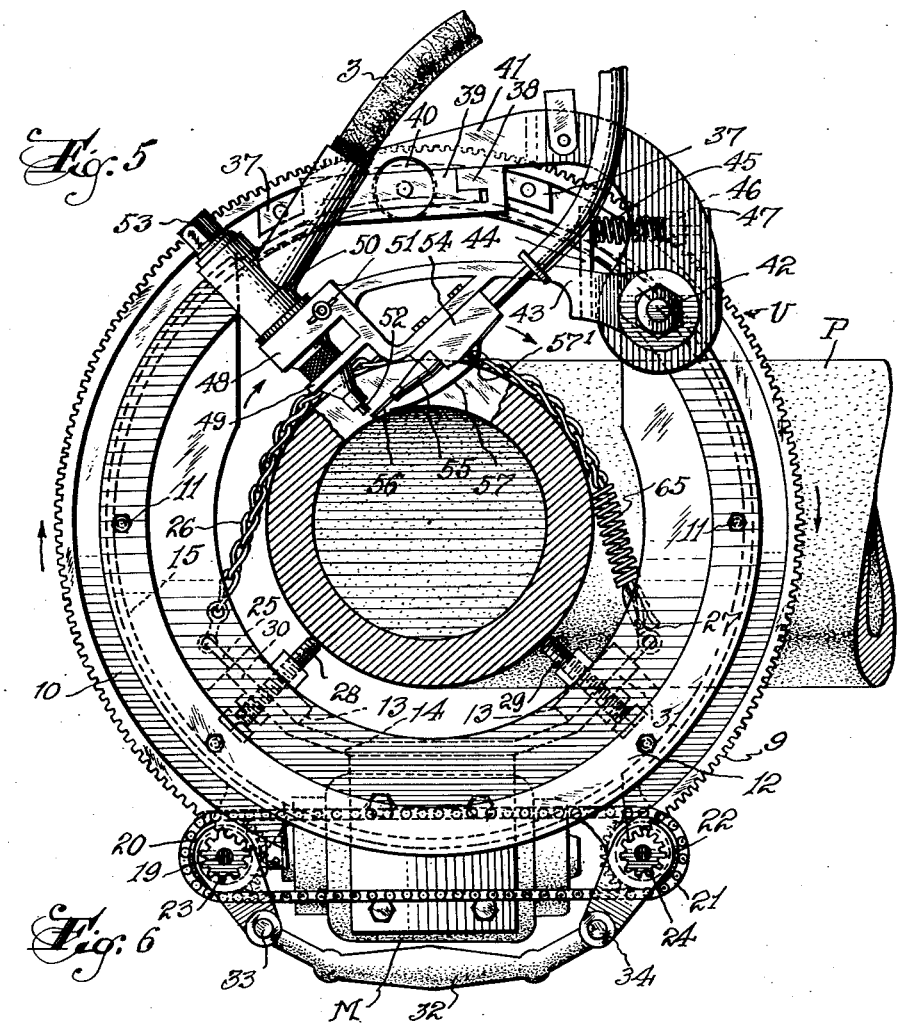
Fig. 5
Fig. 6
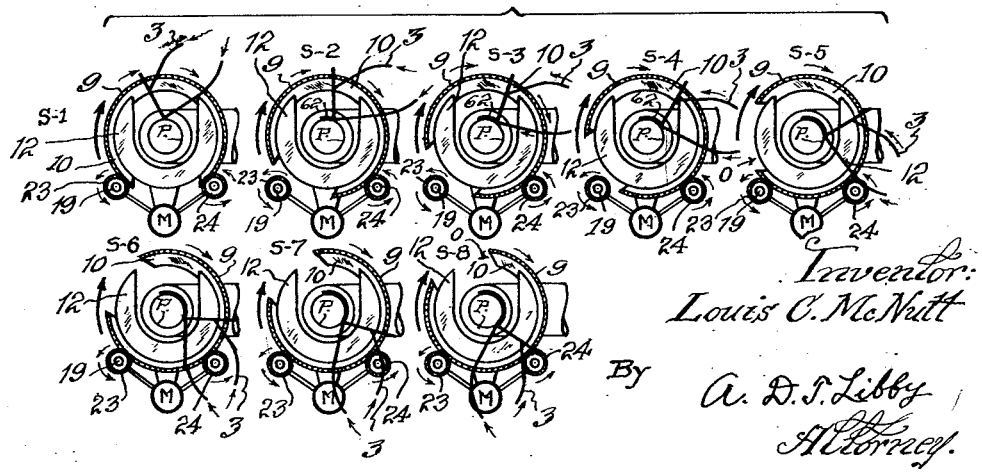
Inventor:
Louis C. McNutt
By A. D. T. Libby
Attorney

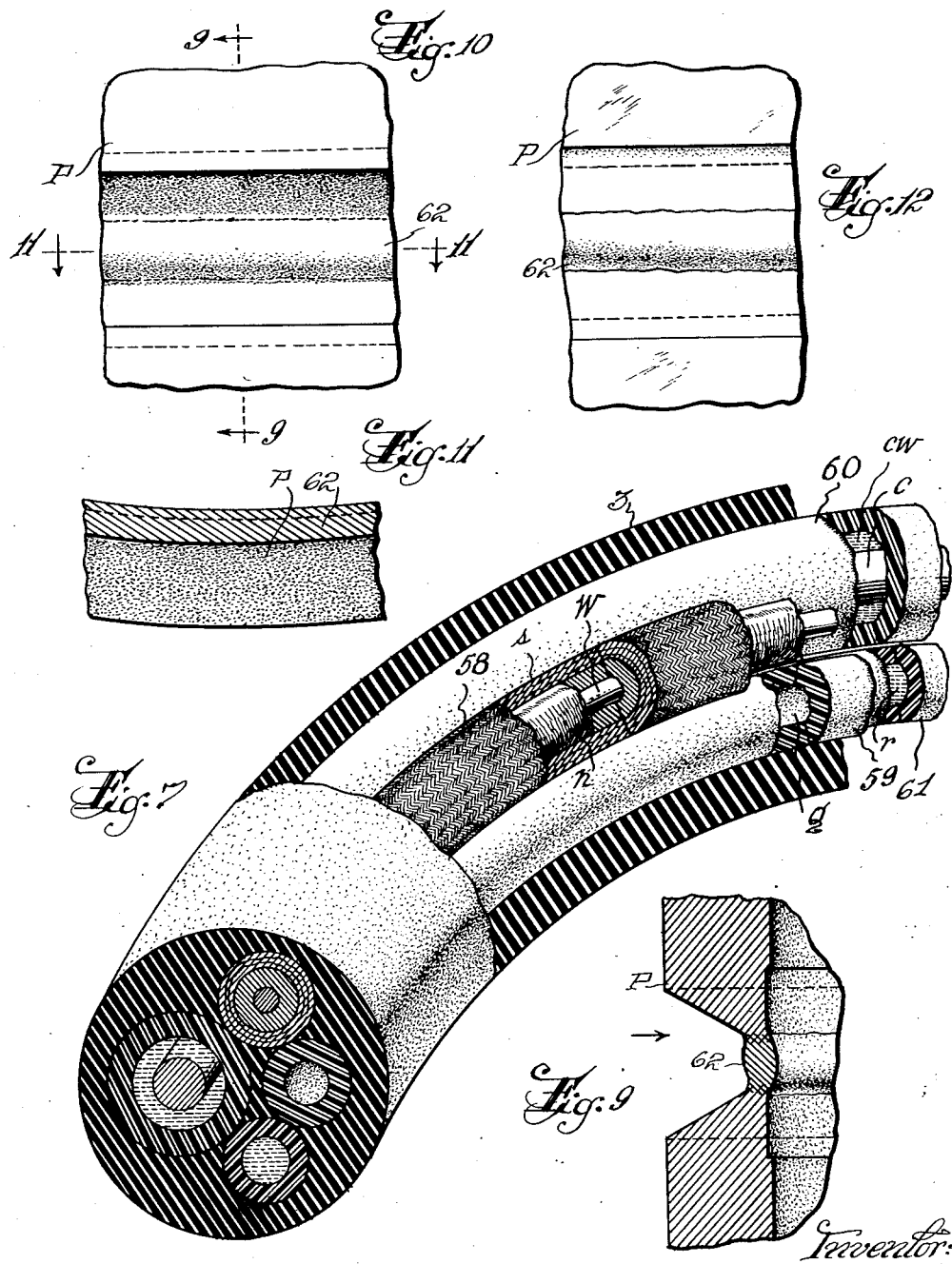

United States Patent Office 2,795,689
Patented June 11, 1957

2,795,689

AUTOMATIC PIPE WELDING APPARATUS

Louis C. McNutt, Scotch Plains, N. J.

Application February 24, 1954, Serial No. 412,299

15 Claims. (Cl. 219—125)

This invention relates to a new and improved means of welding pipes which may be in working position or otherwise. Heretofore it has been the general practice in welding two pieces of pipe together to use internal backing rings around the area between the two pipe ends that are to be welded together. These backing rings are objectionable in that they obstruct the flow of whatever is passed through the welded pipe as they project on the interior wall of the pipe and in addition to this they promote cracking due to the metallurgical notch effect at the junction of the backing ring and weld metal. To overcome this objectionable form of construction I have designed new means and process for making pipe welds. The advantages derived from my new equipment and its method of process use can be summarized in the following manner:

1. Equipment and process of use for automatically making welds in pipes which may or may not be in its final working position.
2. Equipment and process for automatically making pipe welds providing complete penetration without the notch effects of backing rings.
3. Equipment and process for automatically making welds wherein the temperature of the molten pool of metal at the weld is controlled to facilitate the welding operation.
4. Equipment and process for automatic welding in all positions of the pipe which includes the use of a tungsten arc shielded by an inert gas and without the use of a shielded backing up gas.
5. Means for automatically completing a multiple pass pipe weld which includes means for automatically stopping the machine on the completion of the weld.
6. Means for guiding an electric arc torch used in the pipe weld by means of slide and pressure devices.
7. Means for directional control of automatic resetting mechanism for succeeding welds.
8. Means for mechanically staggering the starting points of the resetting mechanism used in the equipment.
9. Means for automatically following any eccentricity of contour for producing the mechanized weld.
10. Means for mechanically overcoming any differential that may exist in the pipe while making the weld.
11. Means of producing a full and complete penetration weld automatically by summation of welding layers wherein no deflection to flow is caused by obstructions on the inside of the pipe, such as a backing ring would produce.

These and other advantages of my new welding system will be clear to one skilled in this art, from a reading of the following specification taken in connection with the annexed drawings.

While inert gas has heretofore been used in welding operations, I have provided for its use in a new manner and with my new welding unit to get the advantages above set forth. The invention is set forth in the attached drawings in which:

Figure 3 is a plan view of the welding unit as applied to an elbow of a pipe.

Figure 4 is a view of just the portion of the unit where the welding arc is located.

Figure 5 is a view similar to Figure 3 but with parts of the unit in a different welding position.

Figure 6 is a diagrammatic illustration showing certain of the unit parts in successive stages of operation.

Figure 7 is a perspective view partly in section of a portion of a specially constructed combination cable used with the welding unit.

Figure 9 is a fragmentary section through a weld just being started such as on line 9—9 of Figures 8 and 10.

Figure 10 is a fragmentary plan view of a weld being started such as in Figure 9.

Figure 11 is a section on the line 11—11 of Figure 10.

Figure 12 is a view of Figure 9 looking in the direction of the arrow.

Referring now to the details wherein like numbers refer to corresponding parts, T is a truck, having a handle H for moving the truck to a position near where the welding is to be done. The truck carries a plurality of devices most important of which are, 1 being a high frequency unit used for establishing the welding arc as will be later referred to. 2 is a wire feeding device for feeding the welding wire from a spool to a feed nozzle carried by the welding unit U. 3 is a flexible cable containing other parts as will be presently described. 4 is a combined transformer and rectifier in combination with a switch box R for feeding welding current to the arc. 5 is a water tank to receive the cooling water coming back from the welding unit as will be later described. The truck T also carries a tank 6 carrying an inert gas which is controlled by the regulator valve 7. Also carried on the truck is a pump 8 for pumping water from the tank 5 as will be later referred to. The truck T also normally carries the welding unit U up to the place adjacent to the pipe joint that is to be welded.

Figure 2:
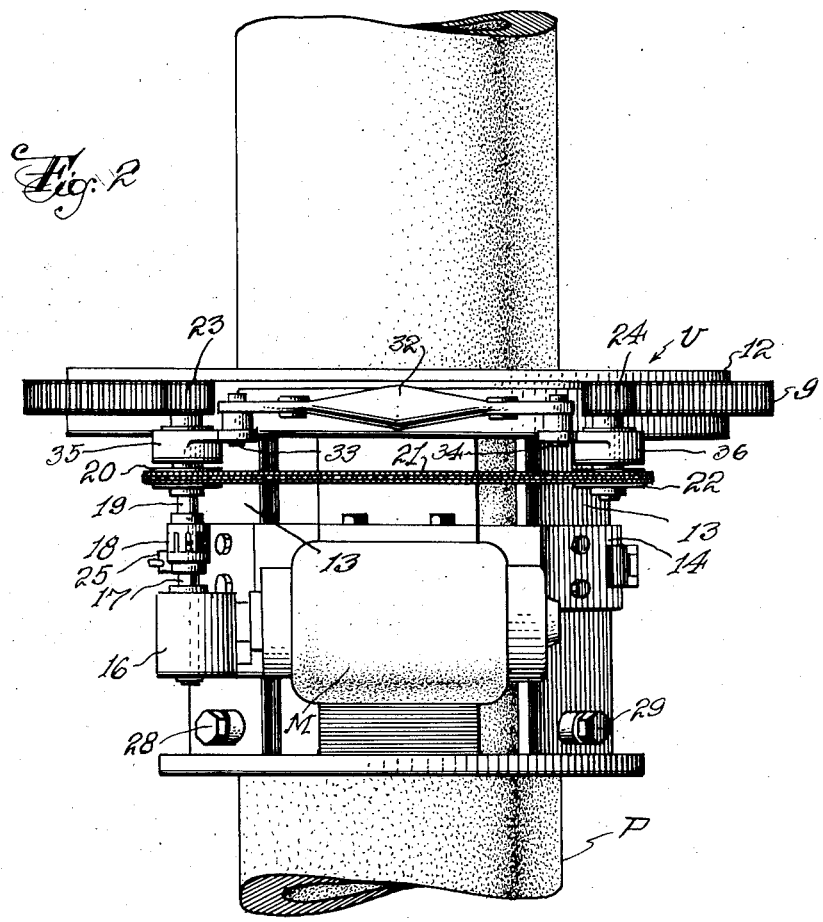
Figure 2 is a front view of just the lower part of the welding unit shown in Figure 1 looking from right to left.

Welding unit U is made up of a plurality of parts, one of the important ones being a ring gear 9 having a flange 10 that fits into a groove or circular recess 15 in the guide and support member 12 that is fastened by a plurality of screw threaded studs 11, to a plurality of arcuately spaced arms 13 Fig. 2 to which are also fastened a support plate 14 carrying a small motor M having a drive gear inside a casing 16. Extending from the said motor drive is a shaft 17 connected to a coupling 18 which in turn is connected to a stub shaft 19 carrying a gear wheel 20 that is coupled by a chain 21 to a gear 22. The gear 20 is connected by a stub shaft to a pinion 23 while the gear 22 through its stub shaft is connected to a pinion 24. The pinions 23 and 24 are in mesh with the teeth of the ring gear 9 for the greater part of its circumference as will be seen by reference to Figure 3 wherein it is shown that the ring gear has an opening O with a space wide enough to go across a pipe, it being understood that this welding unit is made in different sizes to fit pipes of different diameters such as 8, 10, 12 inch and larger diameters of pipes.

Attached to the support plate 14 is a clip 25 to which is attached one end of a chain 26, the links of which are preferably in twisted form so as to secure a good grip on the pipe on which the unit is mounted. The opposite end of the chain 26 is fastened to a link member 27 which as shown is connected to the links on the chain but I prefer to utilize a circularly coiled spring 65 between the link 27 and the chain so as to provide for an adjustable take up, whereby the unit may be securely clamped in position on the pipe P. Furthermore, adjustable stubs 28 and 29 carried by bracket arms 30 and 31 are preferably utilized to centralize the unit on a pipe and also to get further and stronger tension and gripping of the chain 26 all as clearly shown in Figure 5. A handle 32 Fig. 5 is attached through the medium of studs 33 and 34 to support members 35 and 36 for carrying the unit from the truck to the pipe joint that is to be welded.

Figure 8:
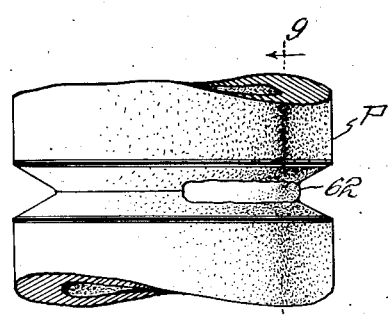
Figure 8 is a perspective view showing the ends of two pipes with the weld just started.

Fastened to and extending upwardly from the flange 10 of the ring gear 9 is a support bracket 37 on which is mounted a member 38 carrying a transversely positioned but vertically operative slide 39 which can be adjusted up or down by an adjusting disc 40. Fastened to the slidable member 39 is one end of an arm member 41, the free end of which is inwardly curved and has a stud 42 on which is pivotally mounted a lever 43 which has an arm 44 against which an adjustable spring 45 is positioned. The spring 45 is adjustably carried by the arm 41 which has a fixed stud 46 and an adjusting screw 47. On the free end of the lever 43 is a pair of spaced arms 48 and 49 which support an L-shaped socket member 50 which is adjustably carried by the arms 48 and 49 by means of an adjusting wing nut 51. The member or holder 50 carries a tungsten electrode and 52 which can be placed in position in member or holder 50 by a removable closure nut 53. The lever 43 carries a holder 54 on which is positioned a feed nozzle 55 for feeding the end 56 of a welding rod to a point adjacent the tungsten end 52. A spring 57 carried by the holder 54 and adjustable thereon by a screw 57' Figs. 3 and 5, acts as a guide and regulating means for the pressure of electrode 56 on the molten metal, it being understood that the electrode 56 is fed at sufficient speed to create a slight pressure on the bottom of the molten pool for the purpose of producing a slight overlay when the weld is started as indicated by the line 62 in Figure 9. The wire feed travel speed is adjusted so as to cool the molten metal to produce a suitable timed chilling action thereby holding a contour of finish bead of the weld with complete penetration as the welding beads or layers are laid down, and successive layers follow the initial layers as shown in Figures 8 and 9. I have found that with this apparatus and process of welding that there is only a very slight protrusion as shown in Figures 8 and 9 of the welding metal at the start of the weld and that no internal blocking means is required and a weld is secured that offers extremely little, if any, obstruction to the flow of materials through the pipe.

Coming now to one of the special features of my invention is the flexible cable 3. This is built up around four individual cables as shown in Figure 7. One of these, 58, contains a welding wire w surrounded by nylon covering n and around this is one or more layers of thin steel tubing s. Another cable 59 is of suitable flexible material carrying an inert gas g. Another cable 60 bears an electrical conductor c carrying the welding current to the arc. Surrounding the cable carrying the current is cooling water cw. A fixed cable 61 carries a water return r. This transfer of the water from the cable 60 to the cable 61 takes place in the socket member 50.

In Figure 6 I have illustrated various steps in the movement of the ring gear 9 and the parts carried thereby by means of the pinions 18 and 19 operated by the motor M. Assuming that the weld is started with the ring gear in position of s–1 Fig. 6 it will be seen that when the gear is moved to the position of s–2 the pinion 23 is out of contact with the gear wheel 9 but the pinion 24 continues the drive until pinion 23 comes back onto the gear wheel 9, thus providing a construction whereby the split in the gear ring for the purpose of placing the same in welding position on a pipe, is taken care of.

Figure 1:
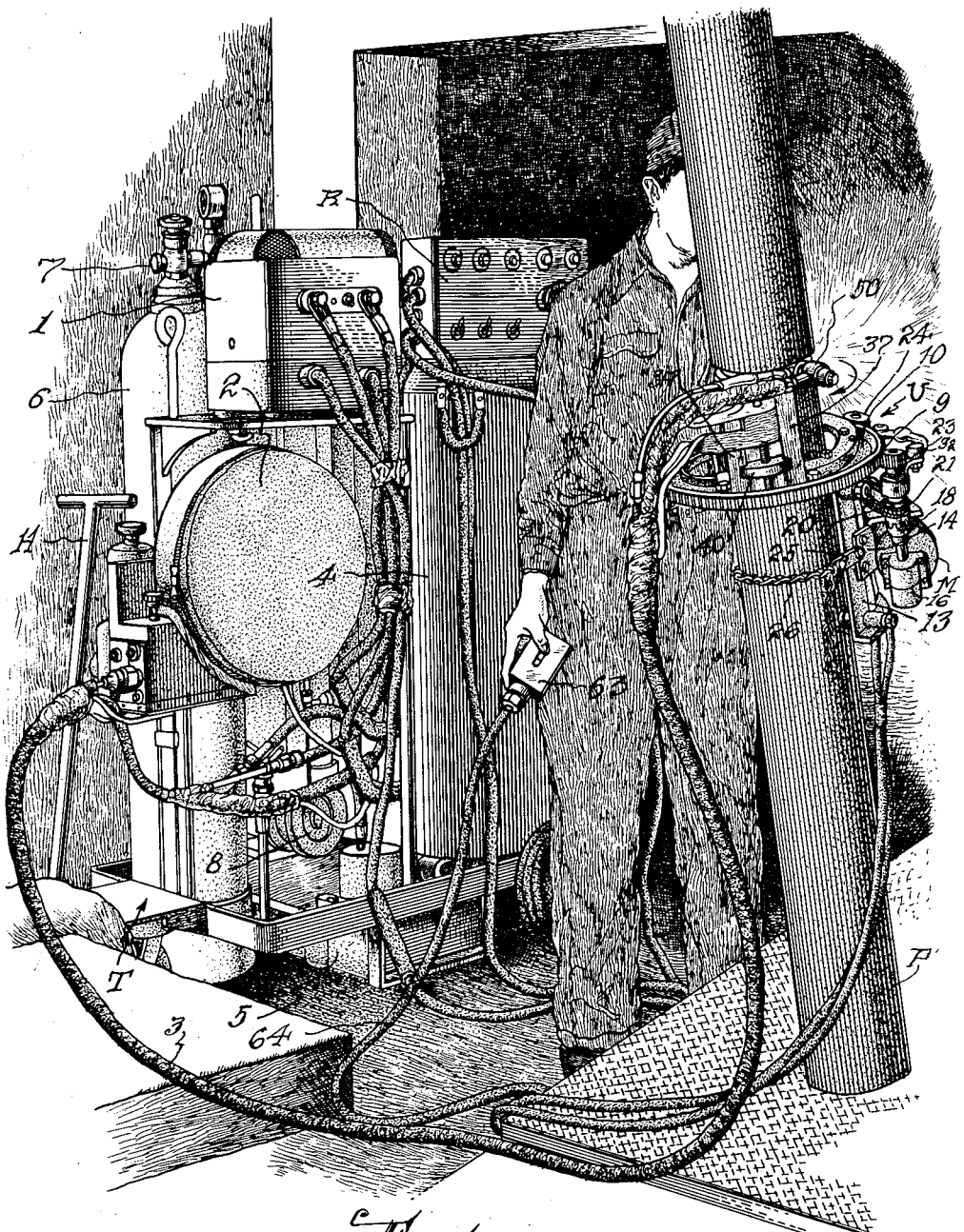
Figure 1 is a perspective view of my new welding unit together with a portable structure forming the equipment utilized with the welding unit.

Referring back to Figure 1 a control switch 63 by means of a suitable cable 64 and other cooperative cables is provided to start and stop the welding operation at any point during the welding operation. Also when a complete cycle around the pipe is made, the motor M is instantly reversed by the automatic control switch means and this prevents the flexible cable shown and described from getting wound around the pipe or otherwise snarled up. Furthermore the switch means R provides a control on the motor M to regulate the speed of rotation of the unit around the pipe and the speed of movement of the welding wire feed. These controls including that of pressure on the molten metal and the chilling action, all serve to produce new and improved results.

An important feature in the present arrangement is the location of the fixed tungsten electrode 52, which as shown in Figure 4, does not have its longitudinal axis on a radius of the pipe which passes through the point where the two inner edges of the pipes to be welded come together, but has a leading angle with respect to the longitudinal axis of the pipe in the direction of welding as shown by the angle theta. By my arrangement, the arc effect by welding at that angle coupled with the pressure produced by the filler electrode 56 enhances a result where there is little or no overflow as indicated in Figure 9 and no obstruction to the material passing through the welded pipe.

It will be obvious to one skilled in this subject that numerous changes in the details and arrangement of the parts may be varied over considerable range without departing from the spirit of my invention and the scope of the appended claims.

Having thus described my invention, what I claim is:

1. An apparatus for welding together two large pipe ends which are of the approximate size as herein specified, either of which may be an elbow, including suitable support devices adapted to be attached to one of the pipe ends, a ring type gear having a supporting flange and rotatably carried by said supporting devices, a holder carrying a tungsten electrode along with an inert gas to establish a welding arc, said gear having a large opening in its periphery so it may be readily passed around one of the said pipe ends to be welded, and another holder suitably supported and carrying a welding wire for making the weld material at said arc, and motor means operatively connected to the ring gear for turning the same around the pipe and switch means for automatically controlling the operation of the motor and the welding arc.

2. An apparatus for pipe welding as set forth in claim 1 further defined in that the motor is operatively connected to the ring gear by gearing means including a pair of arcuately spaced pinions which mesh with the ring gear, the said pinions being spaced a distance so that at least one of the pinions is always in mesh with the ring gear.

3. An apparatus for pipe welding as set forth in claim 1 further defined in that the motor is operatively connected to the ring gear by gearing means including a pair of arcuately spaced pinions which mesh directly with the ring gear, the said pinions being spaced a distance greater than the said opening in the ring gear whereby one of the pinions will always be in operative engagement with the ring gear so the same may be turned full revolutions around the pipe.

4. An apparatus for pipe welding as set forth in claim 1 further defined in that a pair of holders are adjustably carried by the ring gear structure, one holder carrying the tungsten electrode to carry the arc current as well as an inert gas around the end of said electrode while the other holder carries the welding wire for supplying the weld metal, both holders being adjustable to get the proper results.

5. An apparatus for pipe welding as set forth in claim 1 further defined in that a pair of holders are adjustably carried by the ring gear structure, one holder carrying the tungsten electrode to carry the arc current as well as an inert gas around the end of said electrode while the other holder carries the welding wire for supplying the weld metal, both holders being adjustable to get the proper results and further defined in that a single supply cable brings to the electrode and wire holders, a cable for bringing the inert gas to the tungsten holder, another cable carrying a conductor for bringing welding current to the tungsten electrode and cooling water to the holder, another cable for returning the water from the tungsten holder to its source of supply and another cable for feeding the welding wire to its holder.

6. An apparatus for pipe welding as set forth in claim 1 further defined in that a pair of holders are adjustably carried by the ring gear structure, one holder carrying the tungsten electrode to carry the arc starting current as well as an inert gas around the end of said electrode, while the other holder carries the welding wire for supplying the weld metal, both holders being adjustable to get the proper results and further defined in that the arc is started at the tungsten electrode by impressing thereon, for a very short interval, a high frequency current.

7. An apparatus for pipe welding as set forth in claim 1 further defined in that a pair of holders are adjustably carried by the ring gear structure, one holder carrying the tungsten electrode to carry the arc current as well as an inert gas around the end of said electrode while the other holder carries the welding wire for supplying the weld metal, this holder especially being adjustable to provide a suitable pressure on the bottom of the molten metal.

8. An apparatus for pipe welding as set forth in claim 1 further defined in that a pair of holders are pivotally carried on an adjustable arm supported from the ring gear structure and spring means for further adjusting the arm directly carrying the two holders.

9. A pipe welding system including, a gear wheel unit structure having a normal and fixed opening wide enough to allow the wheel to be passed transversely across a pipe to be welded, means for holding the structure on said pipe, said structure including a driving motor having a pair of spaced pinions operatively connected to the motor, said pinions adapted to drivingly engage said gear wheel and move it around the pipe area that is to be welded, a lever adjustably connected to one side of the gear wheel, the lever having a pair of adjustable arms, one of said arms carrying a holder having a tungsten arc electrode while the other arm has a holder for feeding a welding wire to a point adjacent said tungsten electrode, whereby the welding wire will be adjacent the pipe metal that is to be welded together and in cooperative position with the tungsten arc when it starts and means for striking a high frequency arc between said tungsten electrode and the pipe and welding wire and means for feeding an inert gas around the tungsten electrode as and for the purpose described.

10. A system for welding pipes together comprising a unit structure for placement on the pipe adjacent the seam to be welded with means for holding the unit in operative position on the pipe, the unit including a gear wheel having an opening in its periphery to allow the wheel to be slipped into position around the pipe, a pair of arcuately spaced pinions in engagement with the gear wheel, the pinion spacing being greater than said opening in the gear wheel, so at least one of the pinions is always in mesh with the gear wheel teeth, a motor forming part of the unit and operatively connected to said pinions, a pair of holders supported on and above the inner part of the rim of the gear wheel, one of said holders carrying a tungsten electrode and means for feeding welding current and an inert gas to said electrode while the other holder acts to guide a welding metal wire to an arc position adjacent to the tungsten electrode and seam, means for supplying a high frequency current for a very small increment of time to the tungsten electrode to start an arc.

11. A system for welding pipes together as set forth in claim 10 further defined in that manually controlled means are provided for stopping the rotary movement of the unit structure at any time and also further defined in that when a complete cycle is made around a pipe the motor is instantly and automatically reversed.

12. An apparatus for pipe welding as set forth in claim 1 further defined in that the speed and direction of rotation of the unit structure as well as the speed of feeding the welding wire to the arc position are under the control of a single human operator.

13. A system for welding pipes together including, a unit structure for placement around the pipe adjacent to the seam to be welded, the unit structure having a part adapted to be placed in fixed position around the pipe and a movable part carried by the fixed part in operative position with the seam, a motor carried by the fixed part and operatively connected to the movable part to arcuately move it around the pipe, said movable part carrying a holder that has a single fixed electrode and another holder that carries a single movable welding wire in cooperative arc position with the fixed electrode and means for conveying to the fixed electrode a high frequency current to start the arc, and means for supplying an inert gas around the arc as and for the purpose described.

14. A system for welding pipes together as set forth in claim 1 further defined in that the electrode and welding wire are positioned so that at least when the arc is started the axis of the arc is at an acute angle to a radius line from the longitudinal axis of the pipe to the line where the pipe edges to be welded meet as and for the purpose shown and decribed.

15. A system for welding pipes together as set forth in claim 13 further defined in that said fixed electrode is placed at a relatively small angle with respect to a radius line from the meeting of the welding edges of the pipes to the axis of the pipes.

References Cited in the file of this patent

UNITED STATES PATENTS

| | | |
|---|---|---|
| 1,165,827 | Alquist | Dec. 28, 1915 |
| 1,492,356 | Carrol | Apr. 29, 1924 |
| 1,682,593 | Bauer | Aug. 28, 1928 |
| 1,775,311 | Halle | Sept. 9, 1930 |
| 1,949,251 | Gilbert | Feb. 27, 1934 |
| 2,013,630 | Goldsborough | Sept. 3, 1935 |
| 2,227,194 | Moise | Dec. 31, 1940 |
| 2,350,716 | Bissout | June 6, 1944 |
| 2,360,160 | Pickhaver | Oct. 10, 1944 |
| 2,459,047 | Scharf | Jan. 11, 1949 |
| 2,496,347 | Herbst | Feb. 7, 1950 |
| 2,505,054 | McElrath et al. | Apr. 25, 1950 |
| 2,510,205 | Baird | June 6, 1950 |
| 2,512,707 | Anderson | June 27, 1950 |
| 2,532,807 | Girard | Dec. 5, 1950 |
| 2,539,997 | Graves | Jan. 30, 1951 |
| 2,721,248 | Kirkpatrick | Oct. 18, 1955 |